United States Patent
Lawrence

(10) Patent No.: US 7,776,123 B2
(45) Date of Patent: Aug. 17, 2010

(54) FOLDABLE AIR FILTERS AND METHODS OF USE THEREOF

(75) Inventor: Jonathan Gordon Lawrence, Sandy Hook, CT (US)

(73) Assignee: AT&T Intellectual Property I, L.P., Reno, NV (US)

(*) Notice: Subject to any disclaimer, the term of this patent is extended or adjusted under 35 U.S.C. 154(b) by 318 days.

(21) Appl. No.: 11/779,049

(22) Filed: Jul. 17, 2007

(65) Prior Publication Data

US 2009/0019824 A1   Jan. 22, 2009

(51) Int. Cl.
*B01D 46/00* (2006.01)
(52) U.S. Cl. .............. 55/511; 55/497; 55/499; 55/500; 55/501; 55/509; 55/DIG. 31
(58) Field of Classification Search ........... 55/497, 55/499, 500, 501, 511, DIG. 31, 509
See application file for complete search history.

(56) References Cited

U.S. PATENT DOCUMENTS

| | | | |
|---|---|---|---|
| 0,951,819 A | 3/1910 | Lair et al. | |
| 2,969,127 A | 1/1961 | Cook | |
| 3,086,342 A | 4/1963 | Goettl | |
| 3,292,349 A * | 12/1966 | Cuta | 55/511 |
| 3,363,406 A | 1/1968 | Miller | |
| 3,810,350 A | 5/1974 | Scholl | |
| 5,102,436 A * | 4/1992 | Grabowski | 55/483 |
| 5,232,478 A | 8/1993 | Farris | |
| 5,501,794 A * | 3/1996 | Van de Graaf et al. | 210/493.3 |
| 5,507,847 A * | 4/1996 | George et al. | 55/486 |
| 5,531,892 A * | 7/1996 | Duffy | 210/493.1 |
| 5,779,747 A * | 7/1998 | Schlor et al. | 55/497 |
| 5,792,228 A * | 8/1998 | Fath et al. | 55/497 |
| 5,809,800 A | 9/1998 | Deal | |
| 5,914,414 A * | 6/1999 | Taomo et al. | 55/385.3 |
| 6,221,120 B1 | 4/2001 | Bennington et al. | |
| 6,740,137 B2 | 5/2004 | Kubokawa et al. | |
| 6,802,879 B2 * | 10/2004 | Scanlon | 55/367 |
| 6,860,916 B2 | 3/2005 | Kubokawa et al. | |

(Continued)

FOREIGN PATENT DOCUMENTS

DE   10055732 A1 *   3/2002

(Continued)

OTHER PUBLICATIONS

Machine translation of DE 10350119, published Jan. 27, 2005.*

(Continued)

*Primary Examiner*—Michael A Marcheschi
*Assistant Examiner*—Robert A Clemente
(74) *Attorney, Agent, or Firm*—Hanley, Flight & Zimmerman, LLC

(57) ABSTRACT

Foldable filter assemblies and methods of use thereof are disclosed. An air filter assembly including a frame having opposed substantially rigid end members and a flexible side member, the end members being connected to the flexible side member, and an air filter media connected to and disposed within the frame such that the frame is adapted to be disposed in a planar use position, and the end members of the frame are adapted to be moved toward each other prior to installation into the planar use position.

9 Claims, 7 Drawing Sheets

U.S. PATENT DOCUMENTS

| | | |
|---|---|---|
| 7,118,610 B2 | 10/2006 | Lipner |
| 7,497,888 B2 * | 3/2009 | Ashwood et al. ............... 55/499 |
| 7,537,630 B2 * | 5/2009 | Schuld et al. ................. 55/496 |
| 2004/0182055 A1 | 9/2004 | Wynn |
| 2008/0047240 A1 * | 2/2008 | Trautmann et al. ......... 55/385.3 |
| 2009/0151312 A1 * | 6/2009 | Ashwood et al. ............... 55/511 |

FOREIGN PATENT DOCUMENTS

| | | | |
|---|---|---|---|
| DE | 10350119 B3 * | 1/2005 | |
| EP | 1275428 B1 * | 3/2005 | |

OTHER PUBLICATIONS

Merriam-Webster Online Dictionary definition for "flexible", date unknown.*

Merriam-Webster Online Dictionary definition for "flex", date unknown.*

* cited by examiner

FOLDABLE AIR FILTERS AND METHODS OF USE THEREOF

FIELD OF THE DISCLOSURE

This disclosure relates generally to filters, and, more particularly, to air filters that are foldable and methods of using the same.

BACKGROUND

Air filters are constructed for use in air handling and filtration devices, such as heating and cooling equipment for living or work spaces, or in other settings such as air handling equipment used for cooling electronic equipment. These systems typically utilize a fan or blower motor to generate forced air, so as to circulate air or to move air past particular components. To control the airborne dirt or contaminants that would otherwise be stirred in the air and circulated throughout the system or space that is in communication with the system, the fan usually is associated with an air filter that is located within the air flow path generated by the fan. Periodic cleaning or replacement of the air filter is necessary to achieve proper and efficient air flow, as well as to provide proper care and maintenance of the components of such air handling systems.

In air handling systems, it is common to locate an air filter in a plenum through which the forced air travels. Moreover, access for insertion of an air filter is usually provided by a slot formed in the plenum by an elongated opening in a wall of the plenum and supporting rails along the walls adjacent to the wall having the opening. The air filters then typically include a filter media mounted to and surrounded by a rigid four-sided frame that is sized to be slidingly received in a corresponding plenum slot. Thus, it is common to install an air filter by grasping the rigid outer frame and sliding the frame into a slot in a plenum of an air handling system. The air filter generally is removed by again engaging the rigid frame and withdrawing the air filter from the slot.

DETAILED DESCRIPTION

Figure 1:
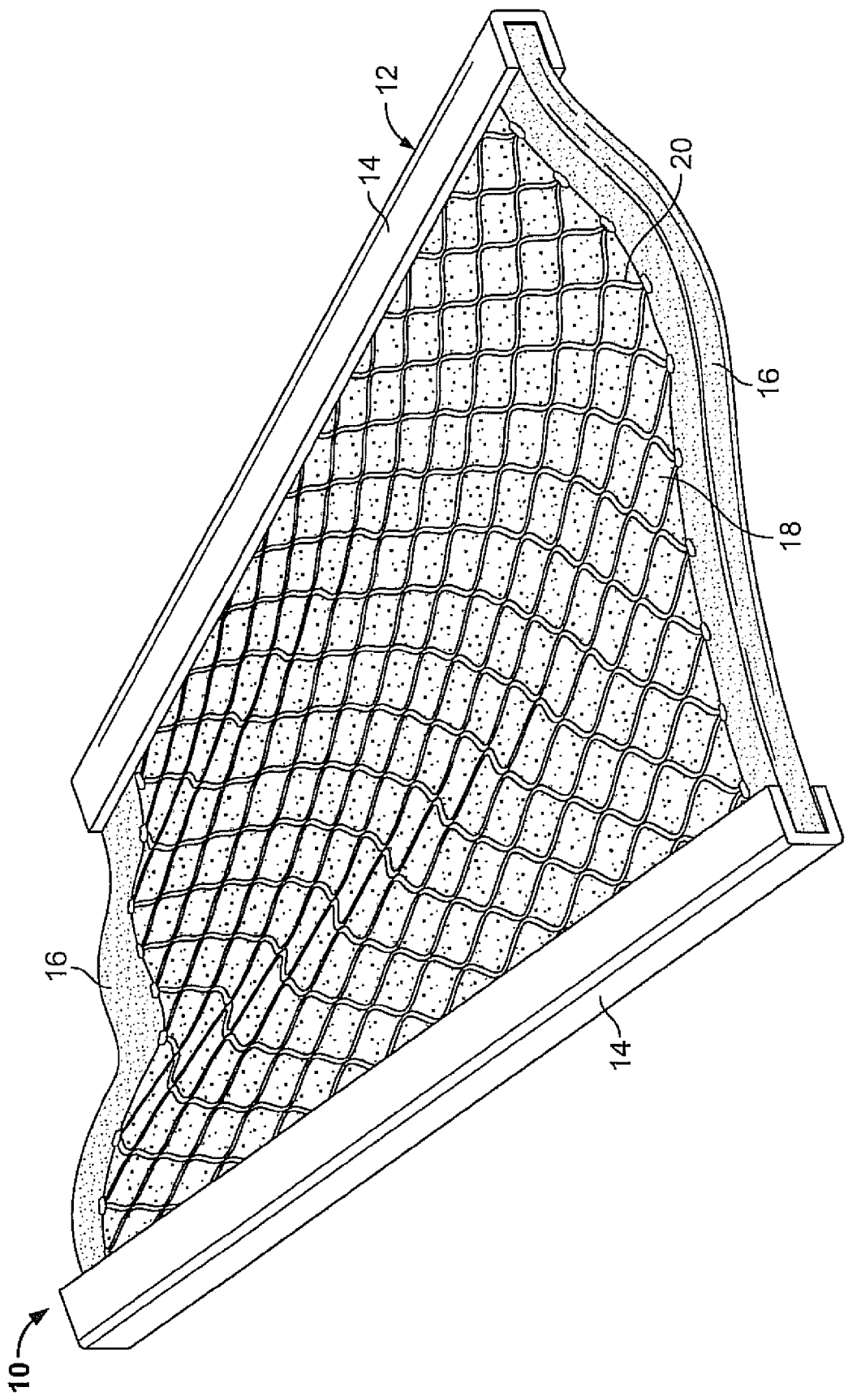
FIG. 1 is a perspective view of an example foldable air filter assembly constructed in accordance with the teachings of the invention.

An example foldable air filter assembly 10 constructed in accordance with the teachings of the invention is shown in FIG. 1. The example air filter assembly 10 includes a frame 12 having a pair of substantially rigid end members 14 connected to a pair of flexible side members 16. In this example, the end members 14 are formed as generally U-shaped channels, and may be constructed of materials that are relatively rigid, such as metal, plastic, or the like. The flexible side members 16 are shown as substantially rectangular columns, constructed of material such as foam rubber or plastic, which is relatively flexible, to permit bending or coiling of the side members, but which is capable of generally retaining a common length from end to end if the side members 16 are otherwise not permitted to bend. The flexible side members 16 also may be connected to the substantially rigid end members 14 by any suitable means, such as by adhesive, mechanical fastener or the like.

The example air filter assembly 10 of FIG. 1 also includes a filter media 18 which is disposed between a pair of webbings 20. The filter media 18 is shown as being of a cellulose construction. However, the filter media 18 may be constructed of any suitable filtering material, whether mesh, foam, pleated paper or the like. The filter media 18 is contained in the space between the end members 14, the side members 16 and the webbings 20, and may be connected to any of these structural elements to assure the filter media 18 will remain properly located relative to the frame 12. The webbings 20 may be constructed in any suitable pattern, such as in the form of a screen, a mesh, netting, or other open cell structure, and may be constructed of any suitable material, such as metal, plastic, or the like. As illustrated in this example, the webbings 20 also are connected to the side members 16 at a plurality of positions. The connections alternatively could be continuous. In the illustrated example, the webbings 20 are connected to the end members 14 along the inside of the U-shaped channels (not shown). The method of forming the connections between the webbings 20 and the end members 14 and side members 16 is somewhat dependent upon the materials chosen for the components. The connections may be established by any suitable means, such as by use of adhesive, welding, mechanical fastener, or the like.

The example air filter assembly 10 illustrated in FIG. 1 may be inserted into a slot in a plenum, through an opening in the plenum wall, in place of a rigid-framed air filter. Thus, a first end member 14 may be inserted into a slot, followed by the side members 16. Because the common rails along the sides of a plenum slot will hold the flexible side members 16 in a straight columnar position, the air filter assembly 10 will continue to move into the plenum slot until fully inserted, with the opposite end member 14 effectively closing the opening in the plenum wall. When fully inserted, the rigid end members 14 and flexible side members 16 will be held captive in a planar orientation, and with the assistance of the webbings 20, will support the filter media 18 in a respective air flow path through the plenum.

The example air filter assembly 10 is foldable prior to insertion and upon removal from the plenum slot. Thus, the end members 14 may be moved toward each other, unlike with a rigid-framed air filter, and the air filter assembly 10 may be coiled into a rolled form for ease of packaging, shipment and handling. If so formed, the air filter assembly 10 would simply be unrolled to be inserted into the plenum slot. Similarly, and advantageously, when the filter media 18 has become dirty and it is time to remove the air filter assembly 10, it may be re-coiled or rolled as it is being removed from the plenum slot, to thereby ensure capture and retention of the contaminants, and to reduce the size of the assembly for more convenient insertion into a container for disposal or for movement to a remote site for cleaning. This presents an advantageous method of preventing the inadvertent release of large amounts of pollutants into the air, some of which may be toxic, carcinogenic (asbestos), allergenic (mold spores), nuisance or conductive (which may be damaging if in the presence of sensitive electronic components).

Figure 2:
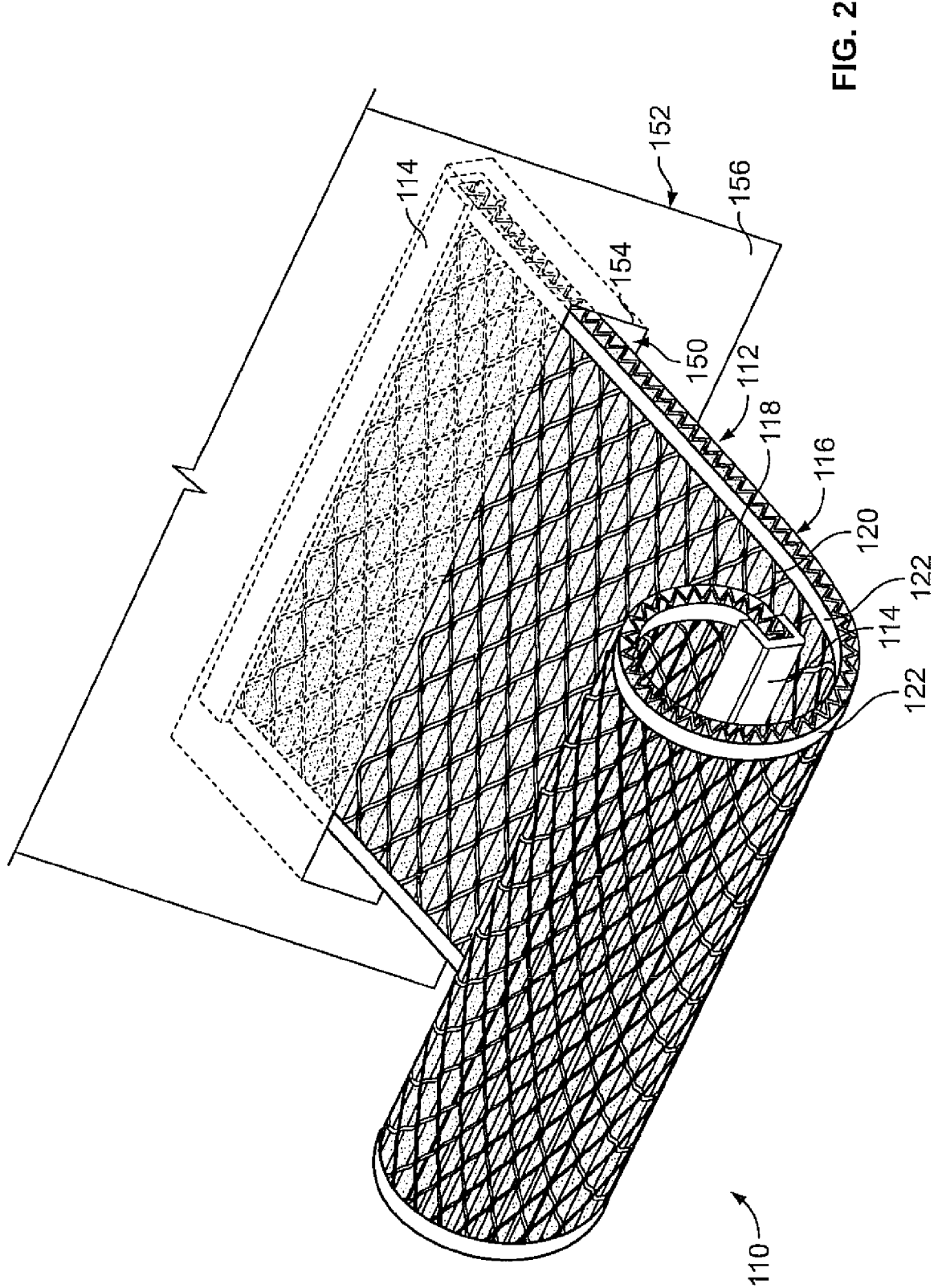
FIG. 2 is a perspective view of another example foldable air filter assembly constructed in accordance with the teachings of the invention and being inserted into a slot in a plenum.
Figure 3:
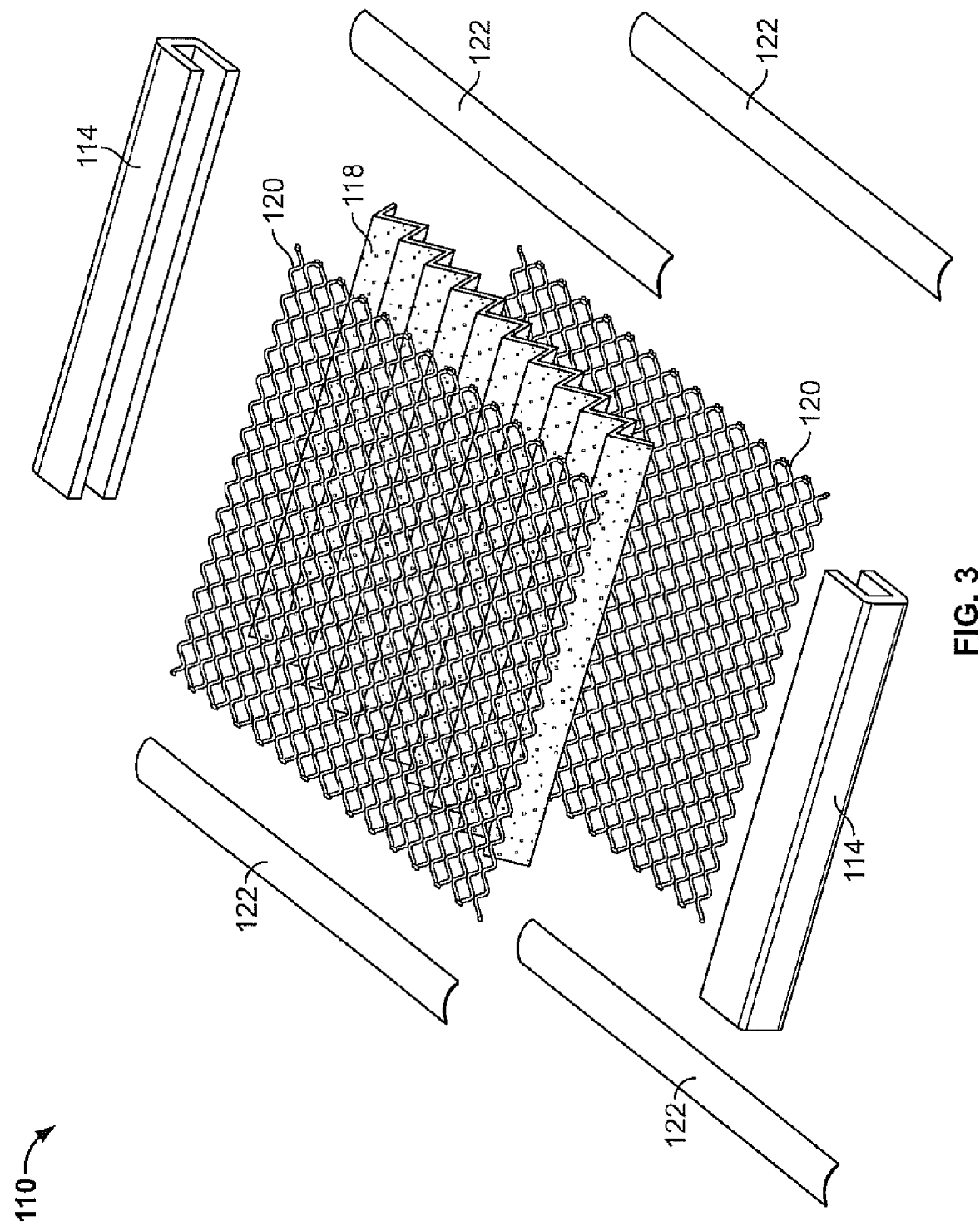
FIG. 3 is an exploded perspective view of the air filter assembly shown in FIG. 2.

This coiling feature is illustrated in FIG. 2, but in conjunction with another example air filter assembly 110 that is constructed in accordance with the teachings of the invention. The example air filter assembly 110 is shown in FIGS. 2 and 3, and includes a frame 112 having a pair of substantially rigid end members 114 connected to a pair of flexible side members 116. The end members 114 of this example may be formed as described above with respect to the end members 14 of the example air filter assembly 10 of FIG. 1. Each flexible side member 116 is shown as including a pair of elongated bands 122. As seen in FIG. 3, each elongated band 122 has an arcuate shape in cross-section. If desired, this may be used to induce coiling when bent, or rigidity when straightened, as is the case with a band of a tape measure. The induced coiling is preferably configured to coil the inlet side of the air filter assembly 110 onto itself, so as to better trap the contaminants upon removal of the air filter assembly 110 after use in an air handling system. The bands 122 may be constructed of any suitable material, such as of metal, plastic, or the like. The flexible side members 116 also may be connected to the substantially rigid end members 114 as described above with respect to the example air filter assembly 10.

The example air filter assembly 110 of FIGS. 2 and 3 also includes a filter media 118 which is disposed between a pair of webbings 120. The filter media 118 is shown in this example as being of a pleated paper construction, but may be constructed of any suitable filtering material, as described above with respect to the air filter assembly 10. The filter media 118 is contained in the space between the end members 114, the side members 116 and the webbings 120. The filter media 118 is connected to the end members 114 and the bands 122 of the side members 116 to retain proper positioning despite having openings along the side members 116. The webbings 120 may be constructed in any suitable pattern, and of any suitable material, as described above with respect to the example air filter assembly 10. In this illustrated example, the webbings 120 are connected along the inside surfaces (not shown) of the end members 114 and the side members 116, providing a smoother exterior surface for the finished product. As with the prior example, the method of forming the connections between the webbings 120 and the end members 114 and side members 116 are somewhat dependent upon the materials chosen for the components, and different suitable means of manufacture may be used.

While the coiling of the air filter assembly 10 in FIG. 1 was described above, such coiling of the example air filter assembly 110 is directly illustrated in FIG. 2. Thus, FIG. 2 shows that the air filter assembly 110 may be inserted into a slot 150 in a plenum 152, through an opening 154 in the plenum wall 156. As shown, a first end member 114 has been inserted into the slot 150, and is being followed by continued insertion of the side members 116. As the side members 116 are being uncoiled and inserted, they take on a straightened columnar shape and the air filter assembly 110 will continue to be advanced into the slot 150 in the plenum 152 until fully inserted. As described above with respect to the first example, when fully inserted, the rigid end members 114 and flexible side members 116 will be held captive in a planar orientation. The webbings 120, end members 114 and side members 116 support the filter media 118 in an air flow path through the plenum 152.

Prior art air filters having rigid frames tend to require a relatively large space when approaching entry of a slot of a plenum or when withdrawing an air filter. This may restrict the design of systems having limited cabinet space or which are otherwise restricted by wiring concerns or other close objects. Also, the rigid frames of common air filters can result in bulky packaging and awkward handling and transportation of the large, rigid four-sided frames.

In addition, the purpose of an air filter is to capture airborne dirt or contaminants. However, when removing an air filter from service, such as for cleaning or replacement, the rigid frame and planar nature of common air filters promotes a tendency to inadvertently shed the contaminants that are present in and on the filter media. This is in part due to openly exposed filter media, and in part due to the difficulty in handling a large, rigid frame during withdrawal and disposal. This latter point can be appreciated when one considers the difficulty in trying to position a waste container or bag to receive a dirty filter, along with the potential of bumping the frame during the removal and disposal process. The rigid nature of prior art frames ensure that any bumping of a frame will transmit vibration through the air filter and will tend to dislodge the tiny particles that were intended to be captured. Thus, common rigid-framed air filters give rise to numerous design constraints and problems associated with their handling.

FIG. 2 is representative of how the example air filter assembly 110 may be folded or coiled upon removal from the slot 150 of the plenum 152. Thus, the air filter assembly 110 may be coiled or rolled for ease of packaging, shipment and handling, as well as for removal and disposal.

Figure 4:
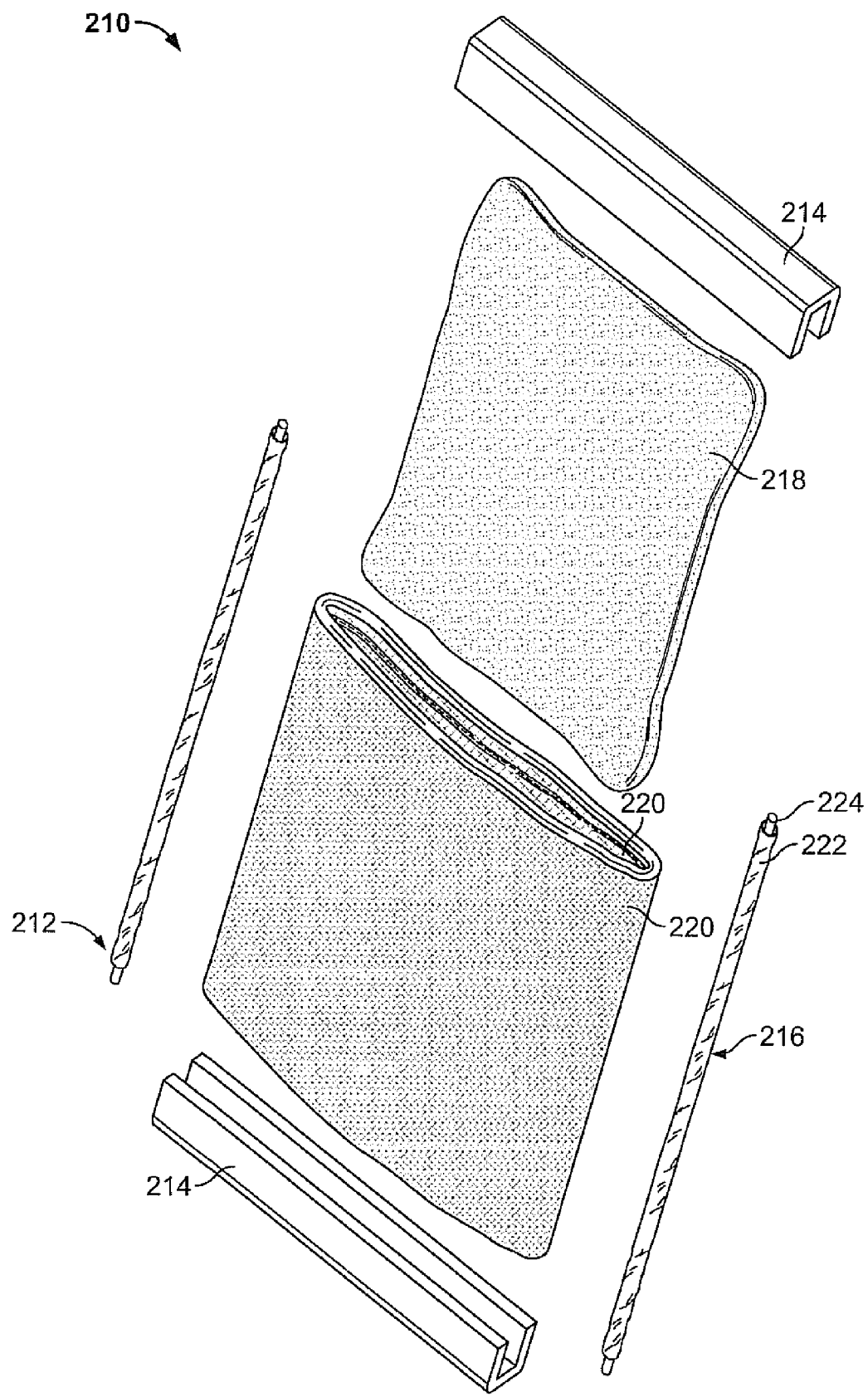
FIG. 4 is an exploded perspective view of another example foldable air filter assembly constructed in accordance with the teachings of the invention.

A further example air filter assembly 210 is constructed in accordance with the teachings of the invention and is shown in an exploded perspective view in FIG. 4. In this example, the air filter assembly 210 has a frame 212 having a pair of substantially rigid end members 214 connected to a pair of flexible side members 216. The end members 214 of this example may be formed as described above with respect to the end members 14 of the first example air filter assembly 10. Each flexible side member 216 is shown as including a flexible tubular casing 222 over a flexible rod 224. The casing 222 may be constructed of plastic, rubber, or the like, and the flexible rod 224 may be constructed of a unitary solid material, such as with plastic, or may be of other suitable construction, such as of woven plastic or metal cable or the like. The flexible side members 216 may be connected to the substantially rigid end members 214 as described above with respect to the example air filter assembly 10.

The example air filter assembly 210 of FIG. 4 also includes a filter media 218 which in this example is disposed between a pair of webbings 220. However, in this example, the pair of webbings 220 are formed as sides of an open-ended envelope of screen material. As shown in FIG. 4, the filter media 218 of this example is of a foam construction, but it alternatively may be constructed of any suitable filtering material. In this example, the filter media 218 is inserted into the envelope of screen, so as to be between the pair of webbings 220. The envelope of screen is then connected to the side members 216 and connected to and closed by the end members 214. While the webbings 220 are shown as being constructed of a screen in the shape of an open-ended envelope, they may be constructed in any suitable pattern, and of any suitable material, as described above with respect to the example air filter assembly 10. As with the prior examples, the method of forming the connections between the webbings 220 and the end members 214 and side members 216 are somewhat dependent upon the materials chosen for the components, and different suitable means may, thus, be used.

The example air filter assembly 210 of FIG. 4 may be used in a similar bending and coiling configuration to that described above with respect to the prior example air filter assemblies 10 and 110. Thus, when the flexible rods 224 in the side members 216 are straightened as they are inserted into a plenum slot, they similarly will take on a straightened columnar shape and together with the substantially rigid end members 214 and the webbings 220, will support the filter media 218 in an air flow path. Also, the example filter shown in FIG. 4 exhibits the advantageous features explained above with respect to the other foldable air filter assemblies 10 and 110, namely, enhanced packaging, transportation, and retention of particulates upon removal from the plenum slot.

Figure 5:
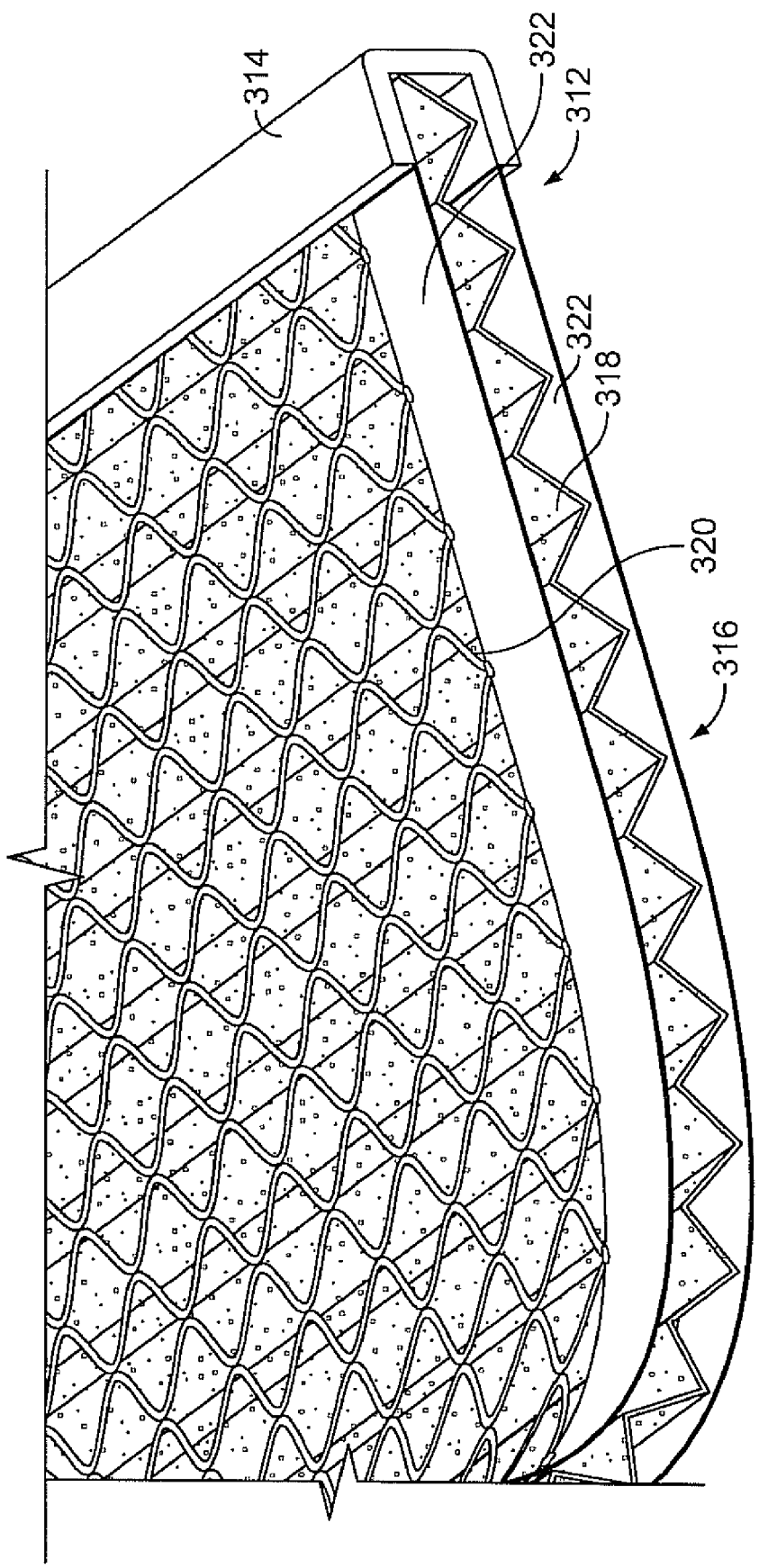
FIG. 5 is a perspective view of a corner of a further example foldable air filter assembly constructed in accordance with the teachings of the invention.
Figure 6:
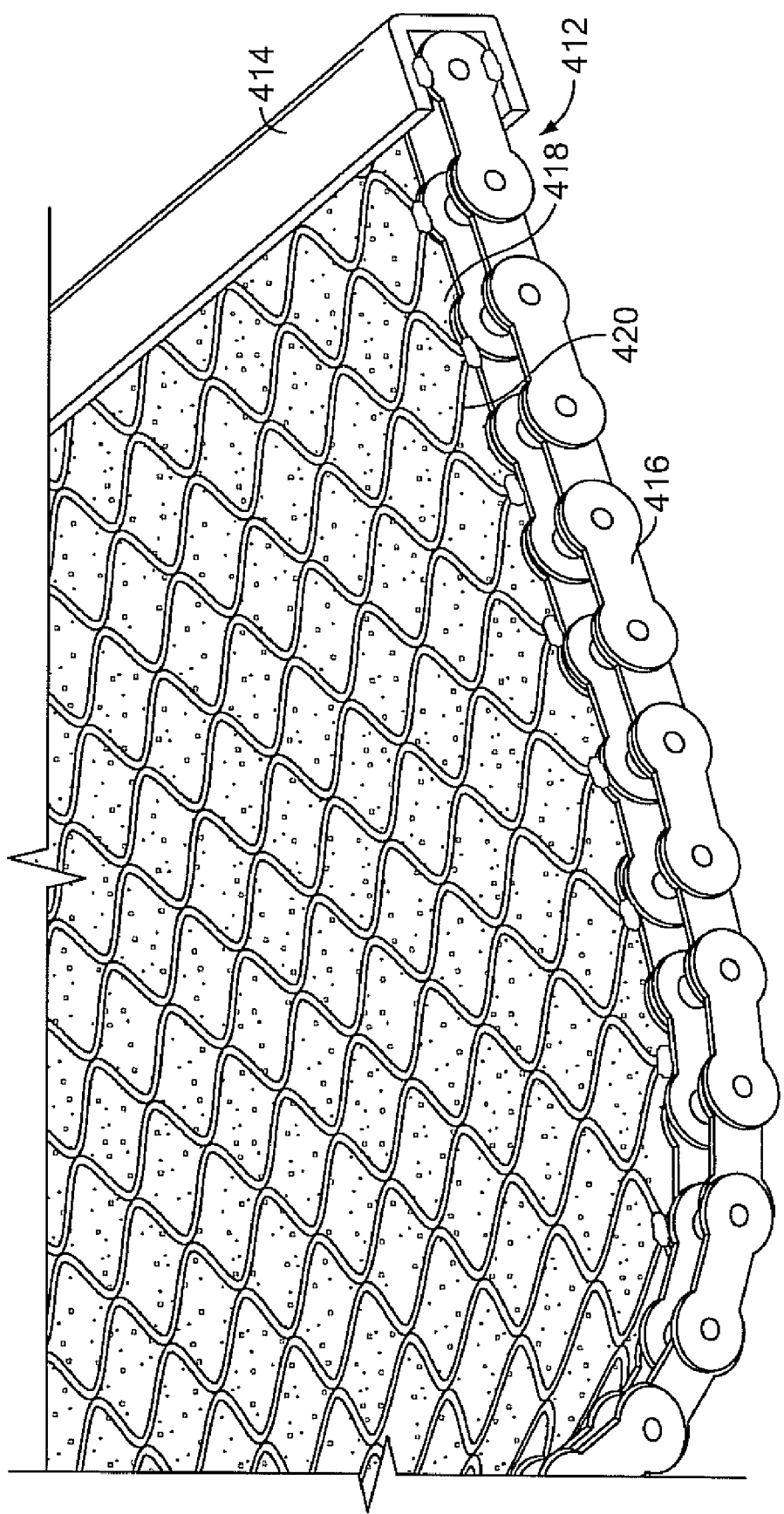
FIG. 6 is a perspective view of a corner of another example foldable air filter assembly constructed in accordance with the teachings of the invention.
Figure 7:
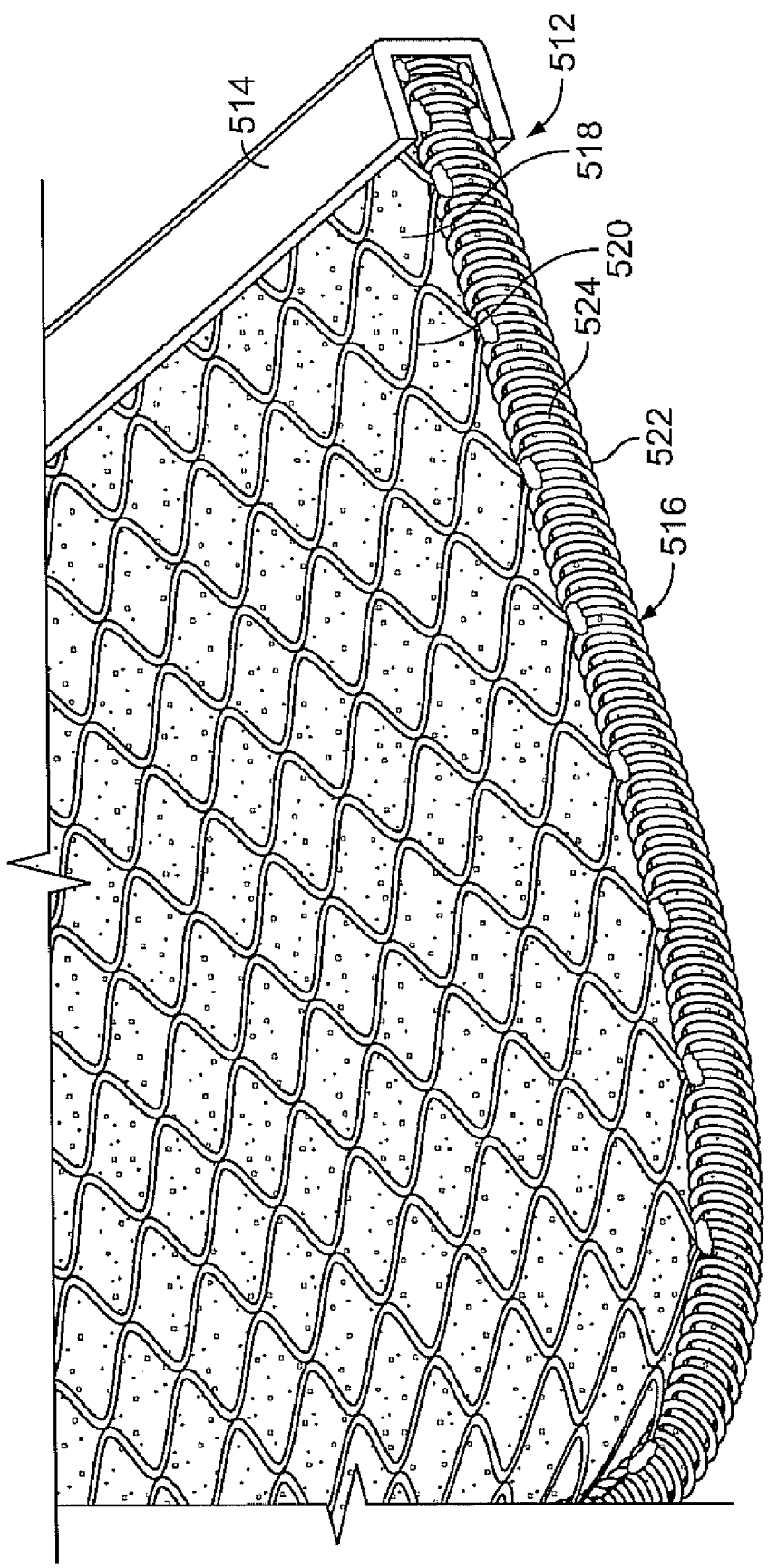
FIG. 7 is a perspective view of a corner of yet another example foldable air filter assembly constructed in accordance with the teachings of the invention.

Representative portions of additional air filter assemblies constructed in accordance with the teachings of the invention are individually shown in FIGS. 5-7. Each of these assemblies provides another example of a side member construction that may be utilized to achieve a foldable air filter assembly.

Thus, in FIG. 5, the example air filter assembly 310 includes a frame 312 having substantially rigid end members 314 and flexible side members 316, with a filter media 318 and webbings 320. However, the side members 316 of this example include a pair of flat flexible bands 322. The construction of this example is otherwise in keeping with that shown in FIGS. 2 and 3, and described in detail with respect thereto.

A corner portion of an example air filter assembly 410 is shown in FIG. 6. The example filter of FIG. 6 includes a frame 412 having substantially rigid end members 414 and flexible side members 416, with a filter media 418 and webbings 420. In this example, the flexible side members 416 are of a chain construction that will permit bending or coiling, but also will resist compression when advanced into an appropriately dimensioned plenum slot. While shown with relatively short hinged sections, it will be appreciated that a plurality of relatively longer hinged sections alternatively may be used, and the sections may be configured to hinge in one direction only, so as to assist in capturing the contaminants within the filter when simultaneously removing the air filter assembly from a plenum slot and coiling it for ease of transportation or disposal. The construction of this example is otherwise in keeping with that shown in FIG. 1, and described in detail with respect thereto.

A corner portion of a further example air filter assembly 510 is shown in FIG. 7. The example filter 510 includes a frame 512 having substantially rigid end members 514 and flexible side members 516, with a filter media 518 and webbings 520. In this example, the flexible side members 516 include elongated coiled springs 522 that permit bending or coiling of filter 510, but have a sufficient spring rate to resist compression when advanced into an appropriately dimensioned plenum slot. The side members 516 also include a rod 524 of filter media material within the center of the springs 522 to help prevent blow-by that may otherwise occur along the sides of the air filter assembly 510 when installed in a plenum slot. It will be appreciated that such additional material may be employed within the side members of the other examples if deemed helpful or necessary to prevent undesirable unfiltered passage through the side margins of the air filter assemblies. The construction of the example shown in FIG. 7 is otherwise in keeping with that shown in FIG. 1, and described in detail with respect thereto.

While for simplicity the present disclosure is made with respect to air filter assemblies being used in a slot of a plenum of an air handling system, persons of ordinary skill in the art will readily recognize that the apparatus and methods disclosed herein also may be used in other types of air filtration systems. Moreover, while the present disclosure shows a particular horizontal orientation of the air filter assembly when installed in a plenum slot, such system is merely illustrative and should not be considered as limiting with respect to the orientation or placement of an air filter assembly that is constructed in accordance with the teachings of the invention. Accordingly, persons of ordinary skill in the art will readily appreciate that the above described examples are not the only way to implement air filter assemblies in accordance with the teachings of this disclosure. An example device in which any of the foregoing air filters may be advantageously employed is shown in U.S. application Ser. No. 11/668,969, which is hereby incorporated by reference in its entirety.

In short, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An air filter assembly comprising:
   a frame having opposed substantially rigid end members and a flexible side member, the end members being connected to the flexible side member;
   an air filter media connected to and disposed within the frame such that the frame is adapted to be disposed in a planar use position, and the end members of the frame are adapted to be moved toward each other prior to installation into the planar use position, wherein the side member is constructed at least in part from plastic tubing.

2. The air filter assembly as defined in claim 1, wherein the end members are constructed at least in part from a U-shaped channel.

3. The air filter assembly as defined in claim 1, wherein the frame is made of at least one plastic material.

4. The air filter assembly as defined in claim 1, further comprising a first webbing connected to at least a portion of the frame.

5. The air filter assembly as defined in claim 4, further comprising a second webbing connected to at least a portion of the frame, and wherein the air filter media is located in a space defined by the frame and the webbings.

6. The air filter assembly as defined in claim 5, wherein the webbings comprise a material adhered to at least a portion of the frame.

7. The air filter assembly as defined in claim 5, wherein the webbings comprise a material welded to at least a portion of the frame.

8. An air filter assembly comprising:
   a frame having opposed substantially rigid end members and a flexible side member, the end members being connected to the flexible side member;
   an air filter media connected to and disposed within the frame such that the frame is adapted to be disposed in a planar use position, and the end members of the frame are adapted to be moved toward each other prior to installation into the planar use position, wherein the side member is constructed at least in part from a section of chain.

9. The air filter assembly as defined in claim 8, wherein the frame is made of at least one metallic material.

* * * * *